July 29, 1924.
A. DEPALM
STUMP PULLER
Filed Jan. 22, 1923
1,503,036
3 Sheets-Sheet 1
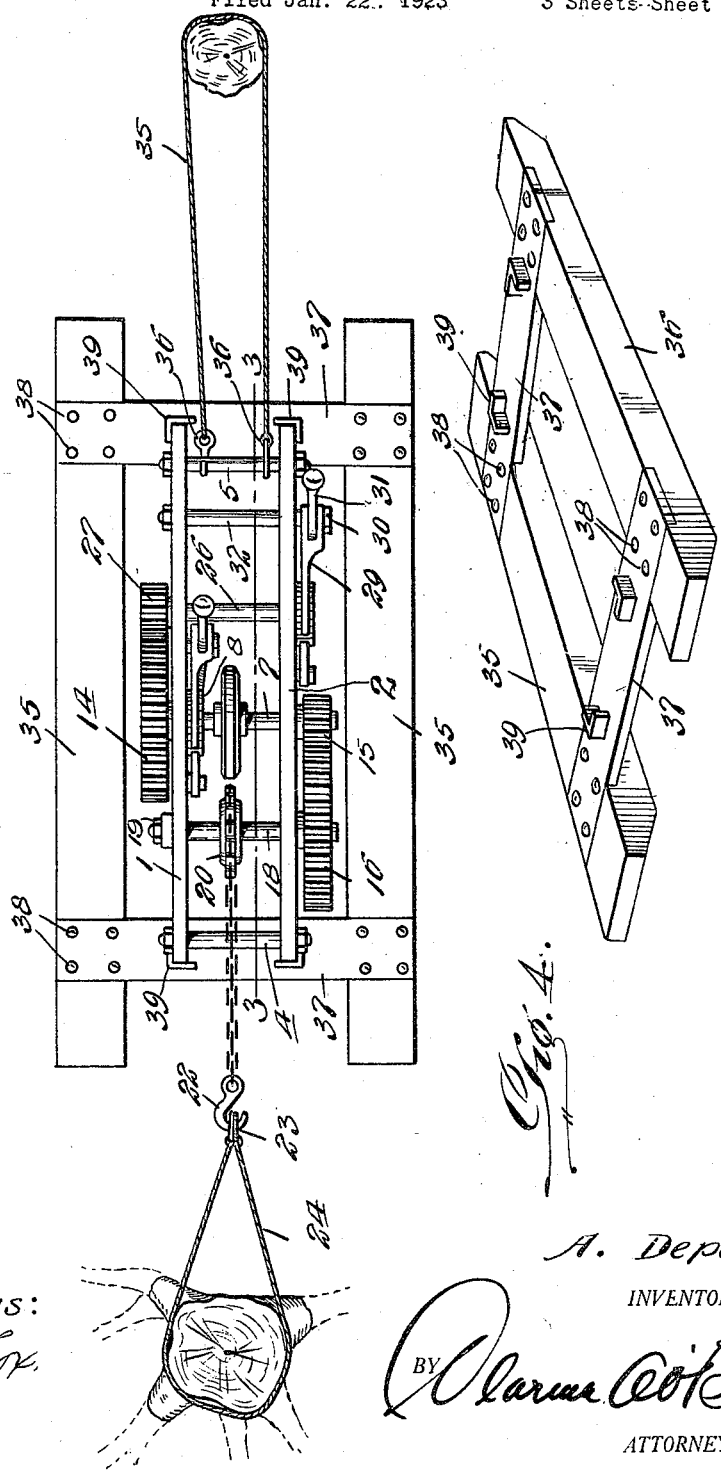
Witnesses:
F. L. Fox.
A. Depalm,
INVENTOR.
BY Clarence A. O'Brien
ATTORNEY.

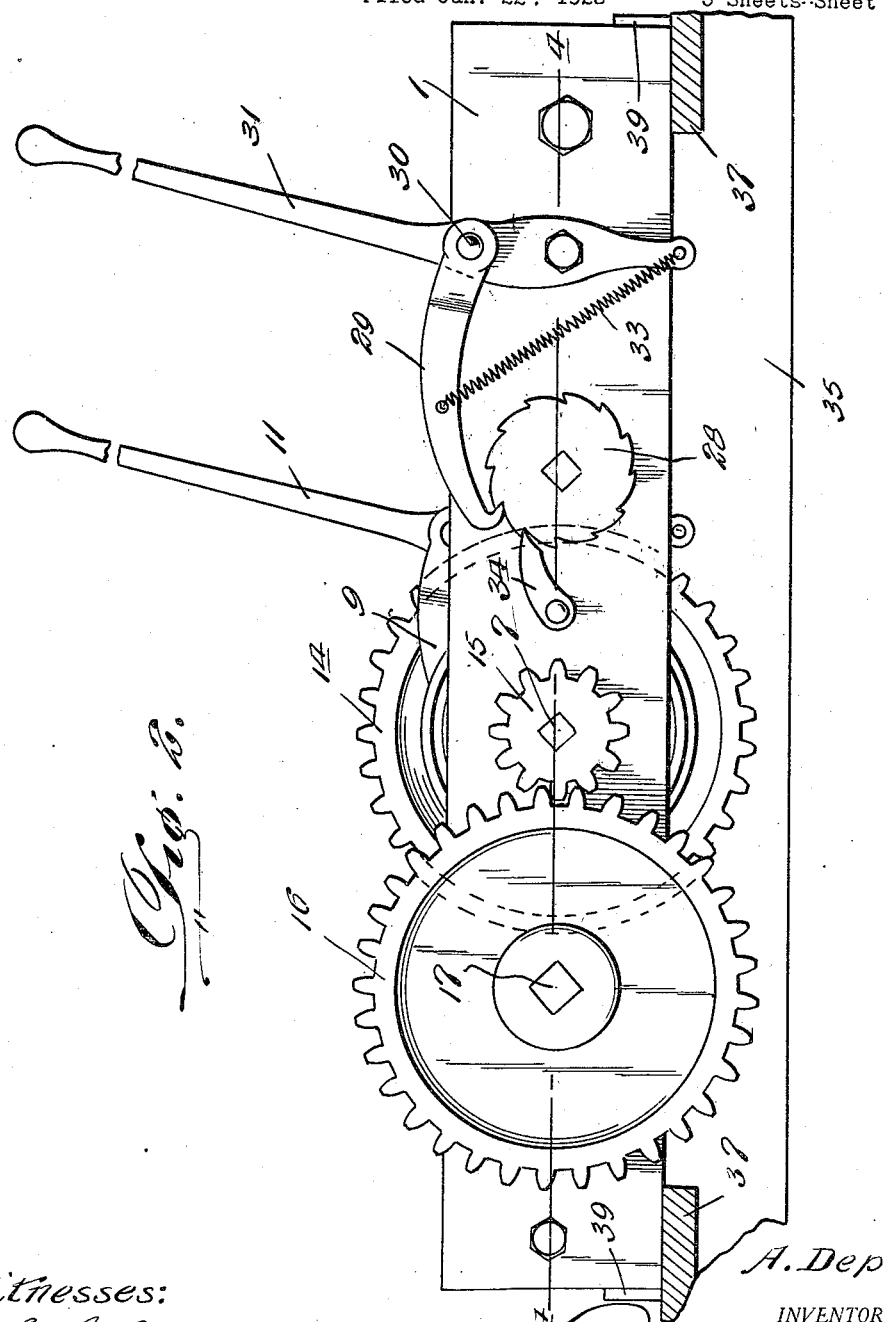

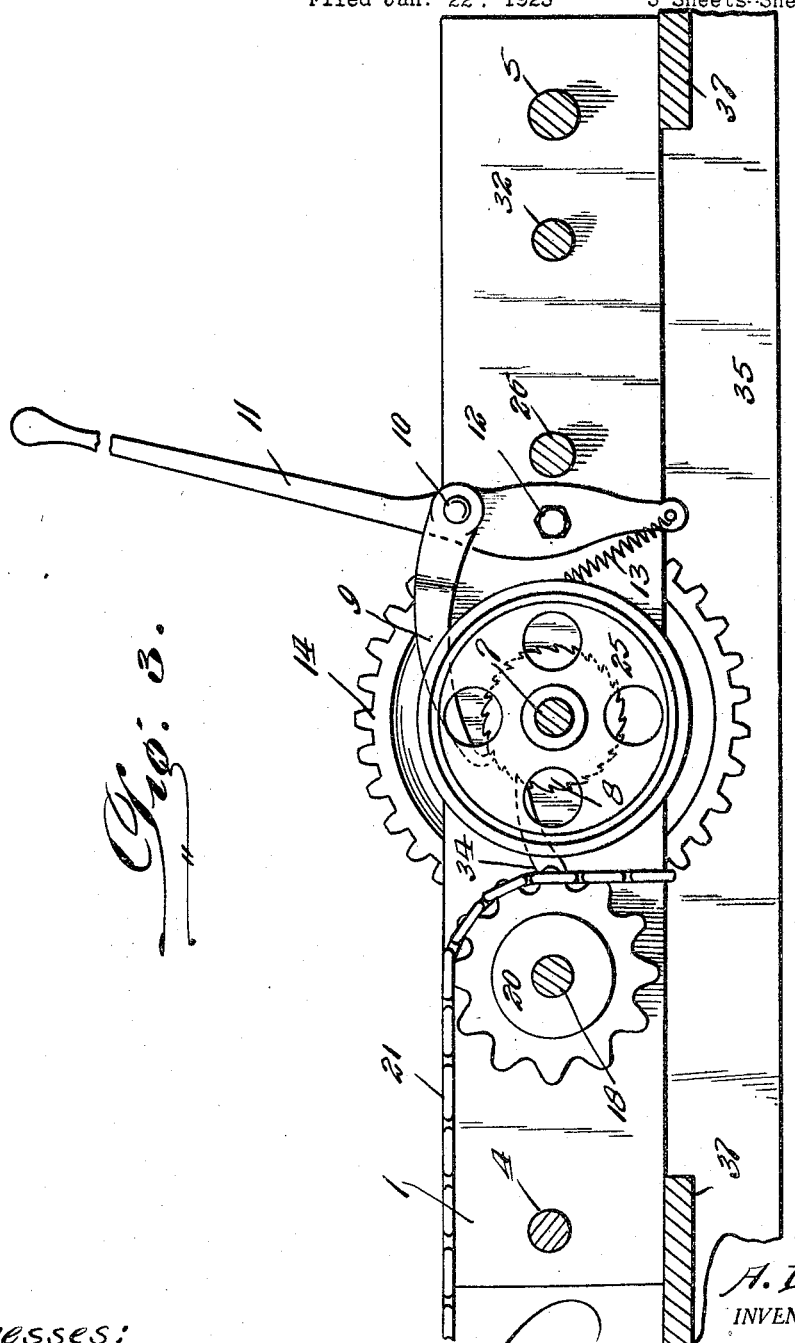

Patented July 29, 1924.

1,503,036

UNITED STATES PATENT OFFICE.

ANTON DEPALM, OF CAMBRIA, ILLINOIS.

STUMP PULLER.

Application filed January 22, 1923. Serial No. 614,076.

*To all whom it may concern:*

Be it known that I, ANTON DEPALM, a citizen of the United States, residing at Cambria, in the county of Williamson and State of Illinois, have invented certain new and useful Improvements in Stump Pullers, of which the following is a specification.

My invention has reference to new and useful improvements in stump pullers, and the primary object thereof resides in the provision of such a device that is so constructed as to be manually operable in pulling stumps, and wherein the power necessary for this purpose may be increased or diminished for pulling stumps of varying diameters.

A further object of the invention resides in the provision of such a device that is comparatively simple of construction, and extremely simple of operation, and further of such a character as to be readily moved from place to place.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 1 is a top plan view of my improved device, the same being shown in a position to be operated for extracting a stump.

Figure 2 is an enlarged fragmentary side elevational view of a device constructed in accordance with the present invention.

Figure 3 is an enlarged longitudinal cross sectional view upon the line 3—3 of Figure 1.

Figure 4 is a perspective view of an improved form of skid adapted for supporting my stump puller, when the same is being employed for the purpose intended.

Referring to the drawings, the device includes a pair of spaced longitudinally extending bars 1 and 2, and engaging through alined openings in the opposite ends of each of the bars are the reduced ends 3 of a front and rear annular-shaped cross bar 4 and 5, respectively. The ends of each of these cross bars project outwardly of the longitudinal bars 1 and 2, and are screw threaded for receiving nuts 6, and these bars not only serve in a manner and for the purposes hereinafter described, but also as a means for properly maintaining the bars 1 and 2 in spaced relation with each other. Freely rotatably journaled within alined openings in the spaced bars 1 and 2, and substantially intermediate the ends of these bars is a transverse shaft 7. Keyed to this shaft, and adjacent the inner face of the longitudinal bar 1 is a ratchet wheel 8, and cooperating therewith, is a relatively elongated dog 9, pivoted as at 10 to a handle lever 11. This lever 11 is pivotally disposed upon a pin 12 carried by the said inner face of the longitudinal bar 1. This dog 9 is normally maintained in engagement with the ratchet wheel 8, through the instrumentality of a coiled spring 13, secured at its opposite ends to the dog and to the lower end of the said handle lever 11.

Any rocking movement of the handle 11, will occasion a rotation of the shaft 7, and keyed or otherwise secured to the projecting end of the shaft 7 is a relatively large spur gear 14, and also keyed to the opposite end of this shaft 7, is a smaller gear 15. The gear 15 meshes with a relatively larger spur gear 16, upon the projecting end 17 of another transverse shaft 18 slightly forwardly of the before mentioned shaft 7. This shaft 18 is also freely rotatable within alined openings in the side bars 1 and 2, the end of this shaft opposite from that carrying the spur gear 16, being reduced and screw threaded for receiving a retaining nut 19. Centrally keyed upon the shaft 18 is a sprocket gear 20, adapted for the reception thereover of one end of a sprocket chain 21, as more clearly shown in Figures 1 and 3. The opposite end of this chain 21 carries a log hook 22, for receiving rings 23 upon the opposite ends of a cable 24, this cable adapted for encircling a tree stump as clearly shown in Figure 1. As a means for retaining the said chain 21 in operative position upon the sprocket gear 20, there is provided a guide wheel 25 keyed to the shaft 7, and in longitudinal alinement with the said sprocket gear. Also freely rotatable within alined openings in the side bars 1 and 2, and rearwardly of the shaft 7, is a still further shaft 26, one projecting end thereof carrying a relatively small spur 27 for mesh with the before mentioned larger spur gear 14 on the adjacent projecting end of the shaft 7.

The opposite projecting end of this shaft 26 carries a ratchet wheel 28, and cooperating with this wheel is a dog 29, pivoted as at 30 to a handle lever 31. This lever being in turn, pivotally supported by one projecting end of a transversely disposed rod or bar 32 within alined openings of the longitudinal bars 1 and 2. The dog 29 is also normally maintained in operative engagement with the ratchet wheel 28, through the instrumentality of a coiled spring 33, connected at its opposite ends to the dog 29, and the lower end of the lever 31.

In view of this latter mentioned shaft 26, together with its operating means, and other associate parts, it will we readily understood that a rocking of the handle lever 31, will rotate the shaft 26 for consequently rotating the shaft 7, and finally the power shaft 18, and as a means for preventing retrograde movement of the shafts 26 and 7, pivoted dogs 34 are provided, one for each ratchet wheel 8 and 28, these dogs being pivoted to their respective longitudinal bars 1 and 2.

Adapted for engaging over a tree or other suitable anchoring means as clearly set forth in Figure 1, is a cable 35, the opposite ends of this cable carrying hooks 36 for engagement over the adjacent cross bar 5 at the rear end of the longitudinal bars 1 and 2.

It will therefore be seen that if a stump is desired to be pulled and my device was connected between this stump and an anchoring means as shown in Figure 1, and if the stump to be pulled, be of relatively small dimensions, the handle lever 11 may be actuated for consequently drawing rearwardly on the chain 21; should however, a reduction of gearing be desired for increasing the power of the device, the other handle lever 31 may be actuated.

As a means for suitably supporting my stump puller for permitting of the same to freely move over the ground, I have provided an improved form of skid, disclosed more clearly in Figures 1 and 5. This skid comprises a pair of longitudinally extending, spaced wooden runners 35 and 36. Adjacent the front and rear edges of these runners, the upper surface thereof is mortised for receiving the opposite ends of cross plates 37, each of these plates being secured to the runners by bolts or the like fastening means 38. Each of the cross plates 37 are provided at spaced points thereon with oppositely disposed L-shaped bracket members 39, adapted for receiving therebetween the opposite ends of the longitudinal bars 1 and 2 of the stump puller, in a manner more clearly shown in Figure 1.

While I have herein shown and described the preferred embodiment of the present invention, it is nevertheless to be understood that minor changes may be made therein, without departing from the spirit and scope of the invention as claimed.

What I claim as new is:—

A stump puller comprising a rectangular frame having an open center, a cable connected with one end of the frame and adapted to be passed around the stump, a power shaft journaled at the intermediate portion of the frame and bridging the space between the sides thereof, ratchet and lever mechanism for rotating said shaft in one direction, means for holding the said shaft against rotation in an opposite direction, a second shaft journaled in the frame and bridging the space between the sides thereof, intermeshing gear wheels operatively connecting the power shaft with the second mentioned shaft, a sprocket wheel mounted upon the second mentioned shaft and located between the sides of the frame, a chain arranged to wind upon the sprocket wheel and adapted to be connected with the stump, a third shaft journaled in the frame at the opposite side of the power shaft from that side at which the second mentioned shaft is located, intermeshing gear wheels operatively connecting the third mentioned shaft with the power shaft, a lever and ratchet mechanism for rotating the third mentioned shaft in one direction, means for holding the third mentioned shaft against rotation in an opposite direction, the first mentioned lever and ratchet mechanism being located adjacent one side of the frame and the second mentioned lever and ratchet mechanism being located adjacent the opposite side of the frame and a skid having brackets adapted to receive the frame between them.

In testimony whereof I affix my signature.

ANTON DEPALM.